April 1, 1930. L. G. RECCHIA 1,752,694
REBOUND ABSORBER
Filed Feb. 12, 1927
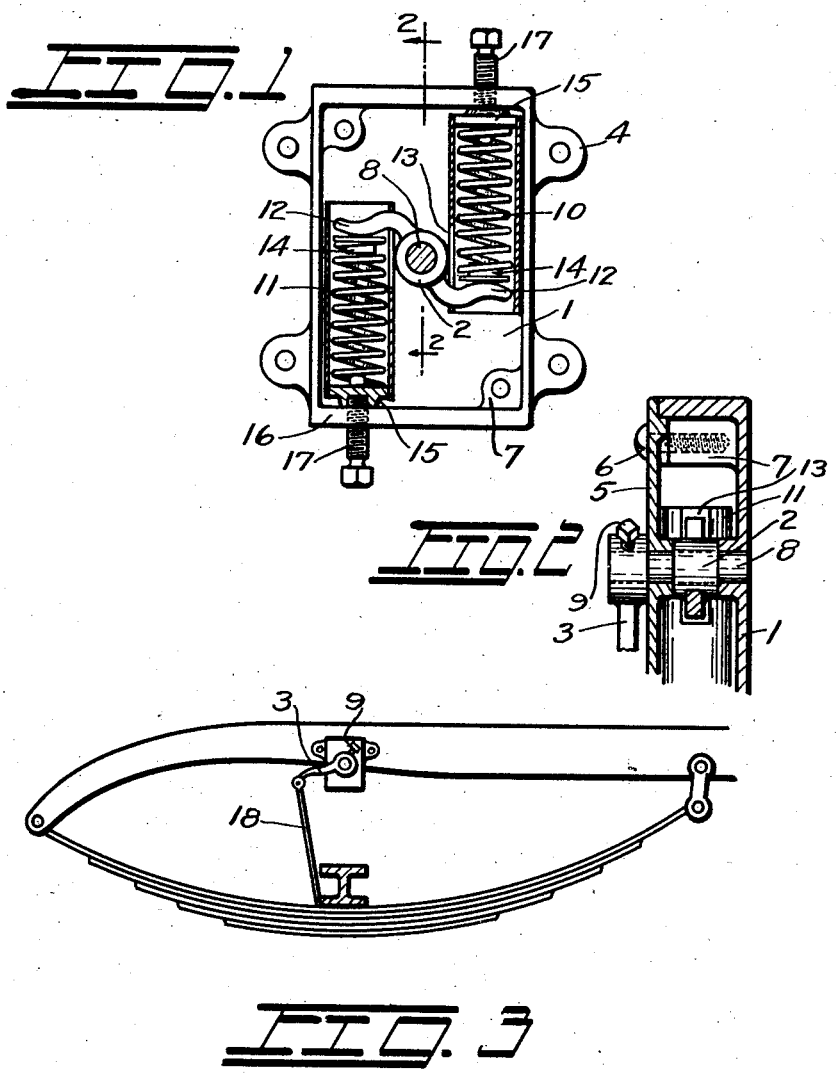
Inventor
Leonard G. Recchia
By Harry Bowen
Attorney Patented Apr. 1, 1930

1,752,694

UNITED STATES PATENT OFFICE

LEONARD G. RECCHIA, OF SEATTLE, WASHINGTON

REBOUND ABSORBER

Application filed February 12, 1927. Serial No. 167,666.

The invention is a device for catching and absorbing the rebound of a spring or other resilient device.

The object of the invention is to provide a device for absorbing the rebound of a spring which embodies a combination of two coil springs.

Another object of the invention is to provide a device for absorbing the rebound of a spring which may readily be installed on a motor vehicle.

And a further object of the invention is to provide a rebound absorber which is of a simple and economical construction.

With these ends in view the invention embodies a plurality of coil springs in a unitary casing, a member with curved arms engaging the ends of the springs and an outwardly extending arm at the outside of the casing to the outer end of which a connection may be made across the spring.

Other features and advantages of the invention will appear from the following description, taken in connection with the drawings, wherein:

Figure 1 is a view showing the interior of the casing with the cover plate removed.

Figure 2 is a sectional view on line 2—2 of Figure 1.

Figure 3 is a figure showing the device as it would appear in use.

The drawings show the device as it would appear in use wherein numeral 1 indicates the casing, numeral 2 the spring holding member within the casing and numeral 3 the arm on the outside of the casing.

The casing 1 may be made as shown or of any suitable shape or design and may be provided with projecting lugs 4 by which it may be held. It is also provided with a cover plate 5 which may be held in place by screws 6 in interior lugs 7 as shown. The member 2 is mounted on a shaft 8 that extends through the casing and the arm 3 is mounted on the outer end of the shaft and adjustably held by a set screw 9 so that the tension on the springs may be readily adjusted.

Springs 10 are mounted in tubular casings 11 and positioned in the casing as shown.
These springs rest against arms 12 on the member 2 which extend through slots 13 in the casings. Washers 14 may be provided at the ends of the springs to engage the arms 12 as shown. Other washers 15 with openings 16 in them to receive the ends of screws 17 are provided at the opposite ends of the springs and it will be observed that as the screws are screwed inward they will increase the tension on the springs and thereby provide additional means for adjusting the tension of the springs. The outer end of the arm 3 may be connected by a tape or strap 18 to the opposite side of the spring as shown in Figure 3.

It will be understood that changes may be made in the construction or arrangement without departing from the spirit of the invention. One of which changes may be in the design or arrangement of the springs or in the use of springs of other types. Another may be in the use of other means for holding the springs and still another may be in the use of other means for adjusting the tension of the springs.

The construction will be readily understood from the foregoing description. To use the device it may be assembled and installed as shown and it will be observed that as the sides of the springs move towards each other the springs will be permitted to expand and then as the load or shock is removed it will be necessary for the springs to be compressed as the spring returns to its normal position. This device therefore provides a very simple, economical, and efficient device that may readily be adjusted and easily installed.

Having thus fully described the invention, what I claim as new and desire to secure by Letters Patent, is:

In a device for absorbing the rebound of motor vehicle springs, a case adaptable to be attached to one side of the spring, an arm extending from the casing, means for connecting the arm to the opposite side of the spring, a member with offset projections at each side in the said casing and rigidly connected to the said arm, compression springs extending from the opposite ends of the casing and engaging the offset projections at points beyond the center of the said casing, sleeves in which the said springs are mounted, washers between the ends of the springs and the ends of the said casing, and adjusting nuts engaging the said washers to adjust the compression of the said springs.

In testimony whereof I affix my signature.

LEONARD G. RECCHIA.